United States Patent [19]

Walton et al.

[11] 3,841,510
[45] Oct. 15, 1974

[54] AIRCRAFT CARGO WINCHING SYSTEM

[75] Inventors: Roger H. Walton, Dayton; James W. Strayer, New Carlisle, both of Ohio

[73] Assignee: The United States of America as represented by the Secretary of the Air Force, Washington, D.C.

[22] Filed: Apr. 30, 1973

[21] Appl. No.: 355,822

[52] U.S. Cl................ 214/516, 198/130, 198/168, 244/118 R
[51] Int. Cl.......................... B60p 3/00, B41j 33/10
[58] Field of Search ............ 214/516, 517; 198/130, 198/168; 244/118 R, 137

[56] References Cited
UNITED STATES PATENTS
3,338,375  8/1967  Evans................................. 198/130
3,572,563  3/1971  Oliver................................ 214/516

FOREIGN PATENTS OR APPLICATIONS
320,326  2/1970  Sweden............................... 214/516
414,386  6/1910  France............................... 214/516

*Primary Examiner*—Albert J. Makay
*Attorney, Agent, or Firm*—Harry A. Herbert, Jr.; Arthur R. Parker

[57] ABSTRACT

An aircraft cargo-loading winch mechanism for loading cargo into the cargo compartment of a transport aircraft, including a main, endless, drive cable incorporating a plurality of swaged balls disposed in evenly-spaced relation therealong, and a driven, auxiliary cable having a claw end engageable with a selected main cableswaged ball and a hook end attachable to the particular cargo to be loaded. Quick-detachable clip elements, in contact with opposite sides of already-loaded cargo and releasably engaged with an appropriately-positioned pair of swaged balls, interconnect the said cargo with the main cable for its movement to a designated position in the cargo compartment.

7 Claims, 5 Drawing Figures

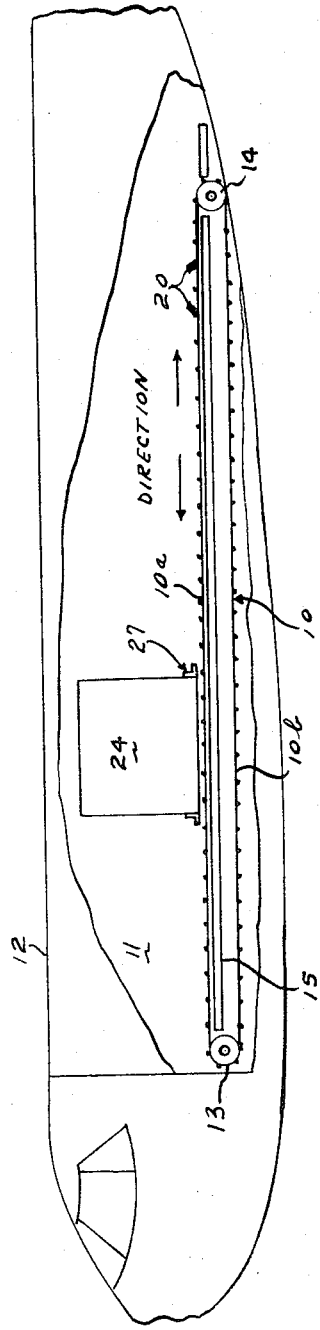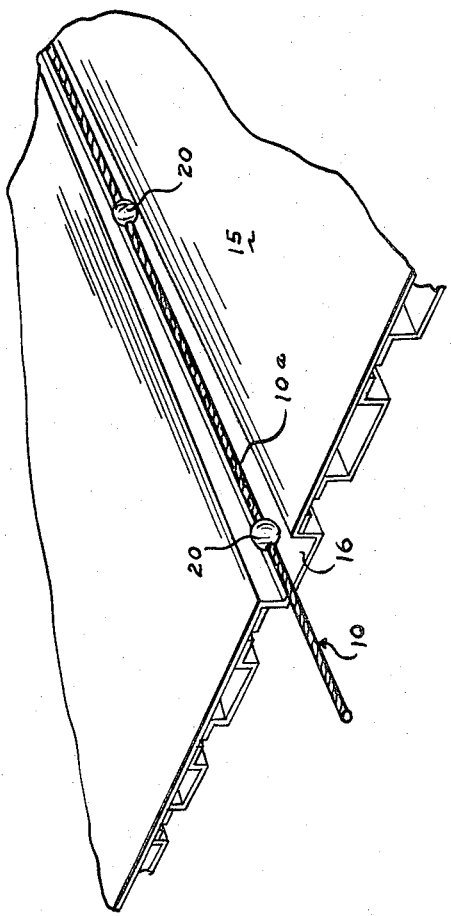

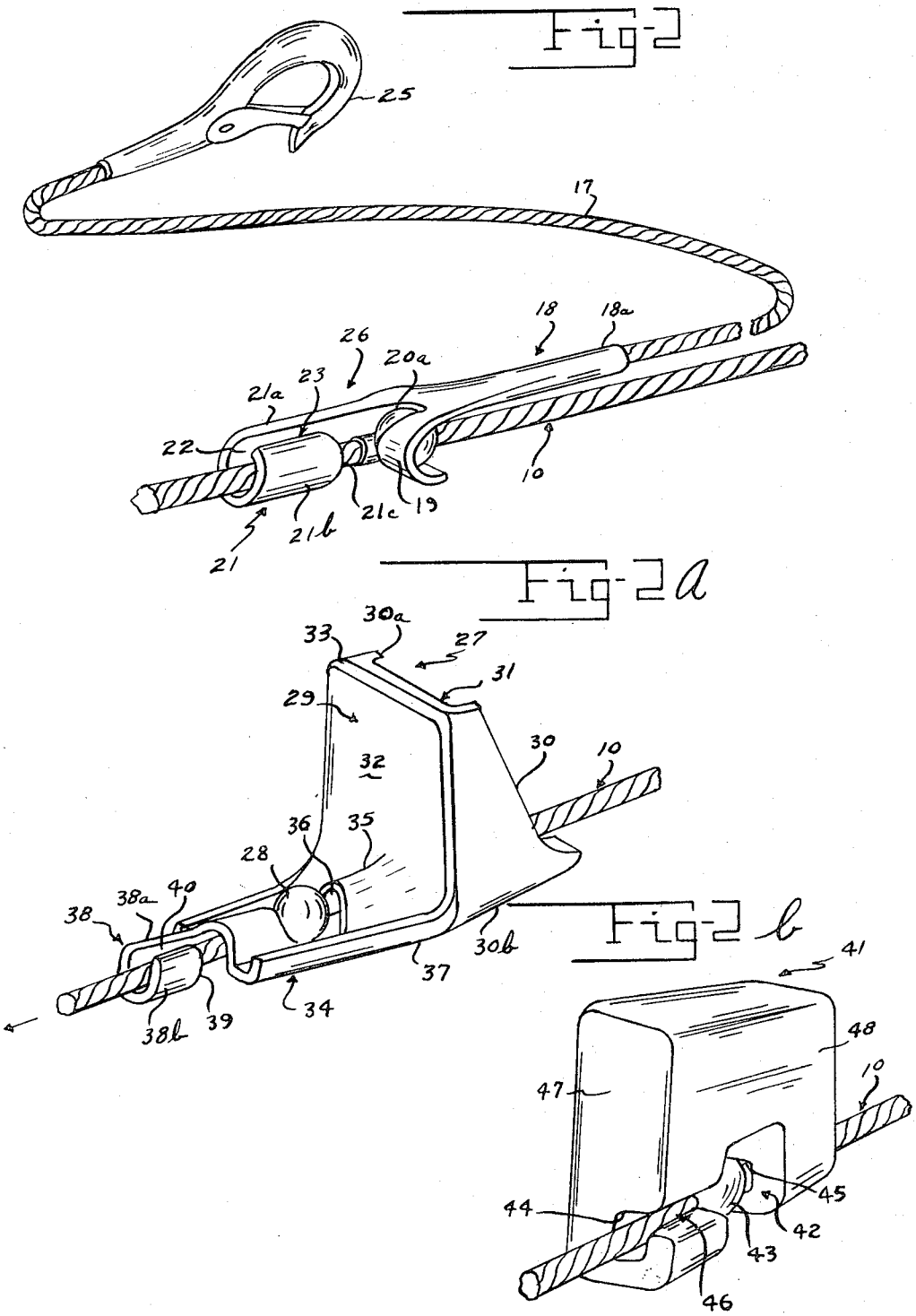

AIRCRAFT CARGO WINCHING SYSTEM

The invention described herein may be manufactured and used by or for the Government of the United States for all governmental purposes without the payment of any royalty.

BACKGROUND OF THE INVENTION

This invention relates generally to an improved winch mechanism for loading and unloading material into, and from the cargo compartment of a transport aircraft, as well as its positioning within the cargo compartment.

In the movement of the heavier-types of cargo by air transport, it is a conventional practice to use a winch mechanism to transfer such cargo, carried either in containers alone or in container-supporting pallets, from a ground transport vehicle of some kind into the aircraft-cargo compartment. Generally, both the ground vehicle and the floor of the cargo compartment will incorporate a roller-conveyor system for slidably supporting the cargo being transported. After the cargo load has been moved to its assigned exact location in the cargo compartment, some built-in means are then employed to firmly lock the cargo in position.

To accomplish the requisite movement of the cargo into the aircraft, the conventional winch mechanism may be attached to the particular cargo load by means of a hook on the end of the winch-cable that is engaged with a bridle which, in turn, is connected to the load. The cable must be first reeled off a drum and, when not in use, would back on the drum for its storage position. The said bridle, in one form thereof, merely comprises a relatively short cable or chain that may be interconnected between a pair of outboard tie-down rings formed on the side of the pallet, for example, supporting the cargo to be towed into the aircraft. With this system, the bridle-cable or chain is formed into a triangular configuration with the base of the triangle extending through the tie-down rings and the apex thereof being formed at the attachment of the winch-cable hook element thereto. However, this system suffers from the built-in disadvantage of making it all but impossible to utilize all available space in the cargo compartment because of the extreme difficulty inherent in the use of the more or less conventional types of winch mechanisms to place adjacently-loaded cargo at a minimum interval with respect to each other. This difficulty is due to the need for the taking up of a certain amount of space by the triangular configuration of the bridle. Obviously, the apex of the bridle triangle is required to be at a minimum distance away from the base thereof, and, moreover, there must be sufficient space to enable the disengagement of the winch-cable hook therefrom. In this connection, if any attempt is made to shorten the altitude of the apex and thus the inherent space occupied by the bridle triangle, then, the tow load being applied to the tie-down rings can easily approach an unacceptably high value.

In addition to the above-outlined disadvantage of currently-used winch mechanisms for hauling cargo onboard a transport aircraft, the winch cable must be extended underneath already-loaded cargo in order to attach its hook end to the next succeeding cargo package to be loaded. This results in a considerable wear and tear on the winch cable, since it actually contacts, and frictionally rubs, and thus has a sawing action against some portion of the container or pallet of one or more previously loaded cargo packages, particularly at the time when the new cargo package being loaded has been hauled to a position of relatively close proximity to the next preceeding cargo load. To solve the foregoing problems involved in the use of conventional winch mechanisms, or, at least, to substantially alleviate them, the new and improved winching system of the present invention, to be described hereinafter in the following summary and detailed description, was specifically developed.

BRIEF SUMMARY OF THE INVENTION

The present invention consists briefly in a novel aircraft cargo winching system that includes, in unique combination, a main, endless, drive cable positioned in, or adjacent to the aircraft cargo compartment-floor and supported for back-and-forth rotation over a pair of oppositely-disposed sheaves; and a driven, auxiliary cable releasably interconnected between the main cable and the cargo load to be placed on board the aircraft. For this purpose, the main drive cable incorporates a plurality of swaged balls disposed at regularly spaced intervals therealong of approximately 10 inches, and the driven, auxiliary cable includes a claw-type-cable end that is releasably engageable with any selected one of the swaged balls, and a hook-type-cable end that is releasably attached to the particular cargo to be transported into the aircraft-cargo compartment.

The above-outlined inventive winching system further uniquely includes an improved and yet simplified means of providing forward and aft movement of onboard cargo to a designated tie-down position in the cargo compartment, by the use of a pair of novel quick-detachable clips that may be easily positioned in contacting relation with opposite sides of an already-loaded cargo package, and interconnected with the main, drive cable by being releasably attached to an appropriately positioned pair of the aforementioned swaged balls mounted on the said main, drive cable. Thus, with the foregoing new and improved arrangement of the present winching system, initially, a cargo package may be generally brought into the aircraft-cargo compartment through the combined operation of any suitable reversible drive motor for driving one of the main cable-supporting sheaves and the driven, auxiliary cable interconnected between one of the swaged balls on the main cable and the specific cargo package being loaded. Thereafter, by installing the inventive pair of clips in contact with opposite sides of the already-loaded cargo package and in engaged position with a corresponding pair of swaged balls on the main cable and then removing the auxiliary cable, the further operation of the power-driven sheave to rotate the main, drive cable will thereafter position the particular cargo load to its designated exact location in the cargo compartment.

Further objects and built-in advantages of the present invention will become readily apparent hereinafter from the following disclosure, taken in connection with the accompanying drawings, in which:

BRIEF DESCRIPTION OF THE DRAWINGS

FIG. 1 illustrates a side elevational view, partly schematic and broken-away, showing the general disposition of the new and improved main, endless cable portion of the present invention within the cargo compartment of an appropriate transport aircraft;

FIG. 1a is fragmentary view, in perspective, depicting the main, endless cable of the present invention with the top run thereof disposed in a channel in the aircraft floor;

FIG. 2 is a perspective view, partly schematic and broken-away, showing the auxiliary cable of the invention installed on one of the swaged balls disposed along with the main cable; and FIGS. 2a and 2b respectively depict partially schematic perspective views of two types of quick-detachable clips utilizable with, and as an integral part of the improvement of the present invention to interconnect already-loaded cargo packages with the main cable.

DESCRIPTION OF THE PREFERRED EMBODIMENT

Referring generally to the drawings and, in particular, to FIG. 1 thereof, the main, endless, and drive cable-portion of the new and improved aircraft cargo-winching system of the present invention is indicated generally at 10 as being mounted within, and extending to opposite ends of the cargo compartment 11 of one type of cargo aircraft 12 to which the present arrangement is applicable. A pair of oppositely-positioned sheaves, at 13 and 14, may be appropriately positioned so as to mount opposite end portions of the main, endless, drive cable 10 for back-and-forth rotational movement within the said cargo compartment 11, preferably in such a manner that one cable run; namely, the top or upper cable run indicated at 10a, of the said cable 10 may be disposed above the aircraft floor, at 15, or in a channel 16 disposed in the said floor 15, as is indicated in FIG. 1a, so as to be in flush relation with the said floor 15. The lower or bottom cable run 10b of the main, endless, drive cable 10 would be naturally disposed beneath the said floor 15. As an alternative, however, both runs 10a, 10b of the said cable 10 could be disposed above the floor 15, if desired.

As is seen particularly in FIG. 2, a driven, auxiliary cable 17, forming an important element of the present invention, may be used to attach a selected cargo load, such as is indicated in schematic form at 24 in FIG. 1, to the main, endless cable 10. For this purpose, the main cable 10 may be equipped with a plurality of swaged balls, as at 20, disposed in evenly-spaced relation along both upper and lower cable runs 10a and 10b thereof, and one end of the auxiliary, driven cable 17 may incorporate a claw-like connector, indicated generally at 18, that may be comprised of the novel structure and be uniquely releasably engaged with the particular main cable-swaged ball, as at 20a (FIG. 2) by means and in the new and improved manner to be hereinafter described in detail. The other end of the auxiliary cable 17 is equipped with a cargo hook, as at 25, for the releasable attachment thereof to each of a plurality of cargo loads, as at 24 (FIG. 1) to be hauled into the cargo compartment of an appropriate aircarft, as at 12. The said claw connector 18 may be uniquely adapted to releasably engage with any selected one of the plurality of swaged balls, such as was previously referred to at 20a in FIG. 2. To specifically provide for the positive and releasable engagement between the claw connector 18 and the chosen swaged ball, as at 20a, the said claw connector 18 may include a first, inner straight and hollow connector portion 18a that may, for example, be disposed in telescopic, attached relation over the appropriate end of the auxiliary cable 17, and a second, substantially cylindrical, combined swaged ball-engaging and main, drive cable-receiving and supporting, connector portion, indicated generally at 26, that is integrally formed as an extension to the front end of the first, connector portion 18a, and which is divided or separated into, and includes the swaged ball-engaging, claw member at 19 and the relatively elongated, cable-receiving and supporting, projecting member, indicated generally at 21 as extending outwardly of the forward end of the first, inner connector portion 18a. Said projecting member 21 further includes a first, arcuate-shaped side at 21a that is formed as a natural and continuous extension from the said first, inner connector portion 18a, and a second, arcuate-shaped side at 21b that is integral with the first side 21a and forms therewith a cradle-type, arcuate-shaped or substantially cylindrical, and centrally disposed and longitudinally oriented recess or passage at 22 for receiving and supporting an appropriate portion of the main, drive cable 10 at a position thereof in spaced relation from the swaged ball 20a. In this connection and as is clearly illustrated in the aforementioned FIG. 2, the side 21b of the second connector portion 26 does not, as in the case of the side 21a thereof, form a natural and continuous extension of the first, connector portion 18a but, instead, is separated therefrom to thereby form a suitable space between its aft end at 21c and the front of the claw member 19 for providing for the initial manual bending of the main, drive cable 10 upwardly therethrough and, then, its subsequent positioning in the previously-noted, cable-receiving and supporting recess or passage 22 of the projecting member 21. For the latter purpose, after its initial movement upwardly through the space between the claw member 19 and the aft end of the side 21b of the projecting member 21, the main, drive cable 10 is installed in the said recess or passage 22 downwardly through an elongated slot, indicated generally at 23 (FIG. 2) that has been cut or otherwise formed in, and actually separates the upper or top surface of the otherwise cylindrical, first and second sides 21a and 21b of the member 21. The actual space required between the side 21b and the claw member 19 naturally depends on the relative ease with which the particular design of the main cable 10 may be deflected. With the foregoing arrangement, therefore, the particular swaged ball, as at 20a to which the claw connector end 18 of the auxiliary cable 17 is to be reasably attached, is thereby trapped or captured in engaged relation between the continuous side 21a of the second, connector portion 26 and the claw member 19. Both the correct alignment of the aforesaid side 21a and claw member 19, relative to the endless cable 10, and their positive releasable engagement with, or capture of, the swaged ball 20a therebetween is ensured by the incorporation of the unique, previously-described second, connector portion 26 as a forward extension on the first, connector portion 18a.

After interconnecting the auxiliary cable 17 between a particular cargo load, as at 24 (FIG. 1) to be loaded on board the cargo aircraft, as at 12, and a selected swaged ball, as at 20a (FIG. 2), on the main, drive cable 10, by the respective attachment thereto of the above-described cargo hook 25 and claw connector 18, the said main, endless, drive cable 10 is rotated in the front or forward direction by the use of any suitable-type of variable speed, reversible drive unit that may be operatively connected to the forward sheave 13 (FIG. 1). This drive unit is not shown, since any one of a number of conventional units may be used for this purpose without departing from the true spirit or scope of the invention. Suffice to say, it may be powered either from the aircraft electrical system or by an auxiliary power unit, as desired. After the particular cargo load, as at 24, has been on-loaded on-board the aircraft, another unique feature of the present invention involves the novel use of a pair of quick-attachable and detachable clips, such as indicated generally at 27 in FIG. 2a, to additionally provide a combined and novel, vertical member means of fixing the already-loaded cargo package, as at 24 (FIG. 1), to the main, endless cable 10 for the express purpose of positively controlling the forward or aft movement of cargo previously loaded on board the aircraft to its designated exact location in the aircraft-cargo compartment 11. Thus, after initially bringing a particular cargo load on board the aircraft by the first-described operation of the main cable 10 and the auxiliary cable 17 interconnected between the cargo and main cable, a matching pair of the quick-attachable and detachable clips, such as is indicated generally at 27 in the aforementioned FIG. 2a, as noted hereinbefore, each of which constituting, in effect, a vertical support member for trapping the selected cargo load therebetween, may thereafter be releasably attached with an appropriately positioned pair of the main cable-attached swaged balls, one of which being indicated at 28, so as to be placed with their vertical member-upright portions, as at 29, in substantial contact against opposite sides of the cargo load.

The above-referred to upright portion 29 of the clip or vertical member 27 may be uniquely comprised of a first, aft, upright-side portion, at 30, that extends or tapers outwardly from a relatively narrow, upper or top-surface portion 30a to a relatively wide, lower or bottom, base-supporting-surface portion 30b for its stable support on the aircraft floor, as at 15 (FIG. 1), or other suitable roller-conveyor means, with the outer side thereof being cut-out with a substantial recess, indicated at 31, for minimizing the overall weight thereof, while, simultaneously therewith, providing a good, strong, stable supporting base or platform to the aft side of the clip or vertical member 27. In addition, the upright portion 29 of the said clip or vertical member 27 further comprises a second, front or forward, upright-side portion, at 32, that is integrally formed to the aft, upright-side portion 30, as is clearly denoted in the said FIG. 2a, and extends from a relatively narrow, upper or top-surface 33 vertically downward to a relatively wide, lower or bottom-surface portion, indicated generally at 34. The latter portion 34 acts, in a manner similar to, and collectively with, the aft side-lower or bottom, base-supporting-surface portion 30b, as a base or platform support for the forward or front end of the clip or vertical member 27 on the aircraft floor 15 or roller-conveyor means and, thereof, as a solid supporting base for the entire clip or vertical member 27.

To specifically provide for the installation of each pair of the above-described clips or vertical members, as at 27, on the main cable 10 in engagement with an appropriate swaged ball, as at 28, the bottom, aft base-supporting portion 30b and a substantially flattened bottom section 37 of the forward, base-supporting portion 34 may be designed to incorporate a longitudinal recess portion, indicated generally at 35, naturally forming an elongated passage through which extends or runs a portion of the main cable 10, as is clearly shown in FIG. 2a. Moreover, the forward or front side of the said recess portion 35 is provided with a notched or cut-out section, at 36, of a sufficient size, and within which the swaged ball 28 is releasably engaged when the inventive clip or vertical member 27 is positioned downwardly thereover on the main cable 10 in contact with the already-loaded cargo to be further moved to its designated location in the aircraft-cargo compartment, as at 11 (FIG. 1).

The lower or bottom-surface portion 34 includes, in addition to the previously-mentioned, substantially flattened bottom section 37, a forward projecting or front extension section, indicated generally at 38, and which includes, in a manner similar to the construction of the claw connector 18 of FIG. 2, a substantially cylindrical configuration comprised of integrally formed, arcuate-shaped projecting side portions, one of which being indicated at 38a as being relatively elongated and a natural continuation from the bottom section 37, and the other being denoted at the reference numeral 38b as being relatively short and arranged with a space between its aft end 39 and the forward end of the substantially flattened bottom section 37 sufficient to provide for the upward bending therethrough of the appropriate section of the main, drive cable 10 to be installed in the natural, cable-receiving and supporting recess formed by the combined arcuate-shaped configuration of the integral side portions 38a and 38b constituting the forward projecting or front extension section 38. Again, for this purpose, the section 38 incorporates an upper or top surface-elongated slot at 40 to allow the movement of the main cable 10 downwardly therethrough for its positioning into the natural recess formed by, and within the said front extension section 38.

As noted hereinbefore, a pair of the inventive clips or vertical members, as at 27 in FIG. 2a, would be positioned on the main cable 10 and releasably attached to a corresponding pair of main cable-mounted, swaged balls, as at 28, in contact with opposite sides of the specific cargo load already placed on-board. Thereafter, the auxiliary cable 17, previously used to bring this cargo load into the aircraft, would then be removed and the main drive cable 10 would be actuated by the previously-mentioned, suitable, conventional motor-drive means (not shown) in operative connection to the forward sheave 13 for the purpose of moving the said cargo load forward or aft to its specific designated location in the aircraft-cargo compartment, where it would be locked firmly in place. Thereafter, the inventive quick-releasable clips or vertical members, as at 27, may then be easily removed because of their inherent clearance with the particular cargo load.

It is noted that the clip or vertical member 27 can be referred to as a one-direction clip, since only its forward or front-side portion 32 may be placed in contact with the cargo load to be positioned within the aircraft-cargo compartment. However, in a modified two-direction form of clip or vertical member, indicated generally at 41 in FIG. 2b, either end thereof, as at 47, may be placed in contact with either side of the cargo to be loaded. For this purpose, the said clip or vertical member 41 is made of a substantially rectangular or block configuration and incorporates a central, swaged ball-receiving opening 42 that extends through the opposite faces, one of which being indicated at 48, of the member 41 in transverse relation to the ends thereof, as at 47. Within the said transverse, central opening 42 may be easily and releasably engaged any of the swaged balls on the main, drive cable 10, such as denoted at the reference numeral 43. Of course, as in the case of the clip 27 of FIG. 2a, a pair of the modified clips or vertical members, as at 41, would be suitably mounted on an appropriately-spaced pair of the main cable-supported, swage balls, as at 43, in vertical-supporting and contacting relation against opposite sides of the on-board cargo load to be further positioned in the cargo compartment.

The main, drive cable 10 and therefore the swaged ball 43 are further maintained in a positive, attached relation with the modified clip or vertical member 41 by means of the incorporation of an arcuate-shaped, longitudinal cable-receiving and supporting passage, at 44 and 45, respectively disposed on opposite sides of the central opening 42, and formed in opposed relation in each of the opposite faces, as at 48, of the said member 41. To provide for the positioning in each of the said opposed longitudinal passages 44 and 45 of the appropriate portion of the main, drive cable 10, elongated slots or entrance openings, as at 46, are used for this purpose. In this manner, the aforementioned opposed portions of the main, drive cable 10 disposed on opposite sides of the swaged ball 43 may be quickly installed in the opposite-facing longitudinal passages 44, 45. In this connection, because even a so-called flexible cable is not really very flexible, the inherent tension of the said main cable 10 will automatically assure the retention of both the swaged ball 43 and itself respectively within the said swaged ball-receiving, transverse opening 42 and the said main cable-receiving and supporting, longitudinal passages, as at 44 and 45.

Thus, a new and novel cargo winching system has been developed by the present invention that is improved over, and will perform all of the functions of conventional winches in a simplified manner by using a main, endless, drive cable containing a series of evenly-spaced swaged balls, an auxiliary, driven cable for easily and releasably attaching each of a plurality of cargo packages to be loaded to a selected main cable-swaged ball, and a pair of novel quick-attachable and detachable clips constituting vertical support member means for opposite sides of on-board cargo that are releasably engaged with an appropriate pair of main cable-mounted, swaged balls.

The present invention is further improved in that the use, for example, of the cable-winding drums, limit switches and other appurtenances of conventional winch mechanisms have been eliminated, and yet all of the important functions thereof retained.

Furthermore, the present winching system offers the built-in advantages of being lighter in weight, more simple to manufacture and operate, easier to maintain and of greater reliability because of having fewer parts than other winching systems and improved wearability for the sheave-wound cargo loading-cable.

We claim:

1. A cargo towing cable or chain apparatus comprising; a main, endless cargo towing, drive cable or chain mounted for rotational, back-and-forth movement in a cargo compartment and adapted to be power driven; a plurality of releasably-engageable, cable or chain-attachment means positioned in evenly-spaced relation along said main, endless, drive cable or chain; first, intermediately-disposed cargo-towing means releasably interconnected between a cargo load to be towed into the cargo compartment and any selected one of the said cable or chain-attachment means, and automatically operative on the initial rotational movement of said main, endless, drive cable or chain to move said cargo load into the cargo compartment; and second, quick-release, cargo towing means releasably mountable to the cable or chain attachment means of said main, drive cable or chain in engaged relation with, and thereby automatically operative to precisely move said on-board cargo load forward or aft to a storage position in the cargo compartment, on the subsequent rotational movement of said main, endless, drive cable or chain; each of said plurality of releasably-engageable, cable or chain-attachment means comprising a swaged ball element; and said first, intermediately-disposed cargo-towing means comprising an auxiliary cable or chain; said auxiliary cable or chain incorporating a hook member positioned on one end thereof and adapted for releasable attachment to the cargo to be loaded; and a combined swaged ball element-engaging and main cable or chain-receiving and supporting means positioned on the other end thereof for releasable attachment to any selected one of the said swaged ball elements, and for supporting said main cable or chain in correct position therein to ensure retention of the selected swaged ball element in said means.

2. In a cargo towing cable or chain apparatus as in claim 1, wherein said combined swaged ball element-engaging and main cable or chain-receiving and supporting means comprises a claw connector member.

3. In a cargo towing cable or chain apparatus as in claim 2, wherein said claw connector member comprises; a first, claw connector-element releasably engageable with the selected swaged ball element; and a second, claw connector-projecting element extending substantially parallel to said first, claw connector-element and releasably capturing therewith the said selected swaged ball element therebetween.

4. In a cargo towing cable or chain apparatus as in claim 3, wherein said second, claw connector-projecting element terminates in a main cable or chain-receiving and supporting section having a portion thereof in spaced relation from said first, claw connector-element and thereby providing a space therebetween for thus allowing the initial manual deflection of a portion of the main cable or chain therethrough for its subsequent positioning in the main cable or chain-receiving and supporting section.

5. In a cargo towing cable or chain apparatus as in claim 4, wherein said second, quick-release, cargo-towing means comprises a pair of quick-attachable and detachable clip element-vertical members each having first, vertical support means adapted to contact and hold said onboard cargo load thereto; second, slotted means for releasably capturing the selected swaged ball element therewithin; and third, arcuate-shaped, cable or chain-receiving and supporting means for receiving and supporting the main cable or chain substantially adjacent the said swaged ball element to thereby positively retain said main cable or chain and said swaged ball element in their attached relation with the said clip element-vertical member.

6. In a cargo towing cable or chain apparatus as in claim 5, wherein said third, arcuate-shaped, cable or chain-receiving and supporting means comprises at least one horizontally disposed, base-support element extending outwardly from said first, vertical support means and incorporating an elongated passage for the positioning of the said main cable or chain therewithin.

7. In a cargo towing cable or chain apparatus as in claim 5, wherein said third, arcuate-shaped, cable or chain-receiving and supporting means comprises a pair of opposed passages formed in said first, vertical support means and extending in opposite relation from said second, slotted-swaged ball-element-capturing means for thereby receiving and supporting the immediate portions of said main cable or chain extending in opposite relation from said swaged ball element.

* * * * *